United States Patent
Mehul et al.

(10) Patent No.: US 11,193,530 B2
(45) Date of Patent: Dec. 7, 2021

(54) ROLLER FOR A POD JOINT

(71) Applicant: SCHAEFFLER TECHNOLOGIES AG & CO. KG, Herzogenaurach (DE)

(72) Inventors: Xavier Mehul, Rosheim (FR); Christophe Walliser, Haguenau (FR); Jean-Philippe Dietrich, Drusenheim (FR)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 680 days.

(21) Appl. No.: 16/071,088

(22) PCT Filed: Feb. 3, 2017

(86) PCT No.: PCT/DE2017/100077
§ 371 (c)(1),
(2) Date: Jul. 19, 2018

(87) PCT Pub. No.: WO2017/133733
PCT Pub. Date: Aug. 10, 2017

(65) Prior Publication Data
US 2021/0172473 A1    Jun. 10, 2021

(30) Foreign Application Priority Data

Feb. 5, 2016 (DE) .......................... 102016201776.4

(51) Int. Cl.
*F16C 19/26* (2006.01)
*F16D 3/22* (2006.01)
(Continued)

(52) U.S. Cl.
CPC ............ *F16C 19/26* (2013.01); *F16C 33/467* (2013.01); *F16C 33/491* (2013.01);
(Continued)

(58) Field of Classification Search
CPC ...... F16C 19/26; F16C 33/467; F16C 33/491; F16C 33/516; F16C 33/547; F16C 33/583; F16C 2361/61; F16D 3/22
(Continued)

(56) References Cited

U.S. PATENT DOCUMENTS 1,018,324 A * 2/1912 Kempster ............... F16C 19/26
384/588
1,293,711 A * 2/1919 Church ..................... F16H 3/30
74/344
(Continued)

FOREIGN PATENT DOCUMENTS

CN    202203292 U    4/2012
CN    103026088 A    4/2013
(Continued)

OTHER PUBLICATIONS

German Search Report for Application No. 17 706 666.9, dated Sep. 10, 2019, 5 pages.
(Continued)

*Primary Examiner* — Marcus Charles
(74) *Attorney, Agent, or Firm* — Rutan & Tucker LLP; Hani Z. Sayed

(57) ABSTRACT

A roller bearing for a pod joint comprising an inner race, an outer ring assembly, a race that runs along a bell section and is disposed on the outer surface of the outer ring assembly, a plurality of rolling elements, wherein the plurality of rolling elements are disposed between the inner race and the outer ring assembly and are formed as rollers, and a cage assembly, wherein the rolling elements are disposed in the cage assembly, wherein the cage assembly is formed as a central cage, wherein the rollers pass through the central cage in a middle area, and the running areas thereof project outward from both sides of the central cage.

18 Claims, 3 Drawing Sheets

(51) Int. Cl.
*F16C 33/46* (2006.01)
*F16C 33/49* (2006.01)
*F16C 33/58* (2006.01)

(52) U.S. Cl.
CPC .............. *F16C 33/583* (2013.01); *F16D 3/22* (2013.01); *F16C 2361/61* (2013.01)

(58) Field of Classification Search
USPC ........ 384/559, 560, 561, 564–565, 572, 904
See application file for complete search history.

(56) References Cited

U.S. PATENT DOCUMENTS

| | | | | |
|---|---|---|---|---|
| 2,016,526 | A * | 10/1935 | Tyson | F16C 33/36 384/565 |
| 2,365,154 | A * | 12/1944 | Storz | F16C 33/60 384/570 |
| 3,194,051 | A * | 7/1965 | Schnoll | F16C 19/00 73/9 |
| 3,980,359 | A * | 9/1976 | Wetherbee, Jr. | F16C 19/06 384/470 |
| 4,480,500 | A * | 11/1984 | Yamamori | B60K 17/08 475/246 |
| 4,896,239 | A * | 1/1990 | Ghose | F16C 25/08 360/267 |
| 5,525,109 | A * | 6/1996 | Hofmann | F16D 3/2055 464/111 |
| 6,247,847 | B1 * | 6/2001 | Lob | F16C 33/363 384/51 |
| 6,406,190 | B1 * | 6/2002 | Yoon | F16C 19/26 384/551 |
| 6,582,131 | B2 * | 6/2003 | Rossner | F16C 19/26 384/572 |
| 7,230,359 | B2 * | 6/2007 | Iles-Klumpner | H02K 1/276 310/156.53 |
| 7,338,213 | B2 * | 3/2008 | Schroder | F16C 23/086 384/558 |
| 2004/0077412 | A1 | 4/2004 | Perrow | |
| 2008/0235906 | A1 * | 10/2008 | Arnold | F16C 33/201 16/274 |
| 2013/0301973 | A1 * | 11/2013 | Wendeberg | F16C 19/26 384/551 |

FOREIGN PATENT DOCUMENTS

| | | |
|---|---|---|
| DE | 19839486 A1 | 3/2000 |
| DE | 102004025531 A1 | 12/2005 |
| DE | 112008002567 T5 | 10/2010 |
| EP | 1210945 A1 | 6/2002 |
| JP | H08303455 A | 11/1996 |
| WO | 2009041211 A1 | 4/2009 |

OTHER PUBLICATIONS

International Search Report for Application No. PCT/DE2017/100077, dated May 31, 2017, 5 pages.

* cited by examiner

ROLLER FOR A POD JOINT

CROSS-REFERENCE TO RELATED APPLICATIONS

This application is the U.S. National Phase of PCT/DE2017/100077 filed Feb. 3, 2017, which claims priority to DE 102016201776.4 filed Feb. 5, 2016, the entire disclosures of which are incorporated by reference herein.

TECHNICAL FIELD

The disclosure relates to a roller bearing for a pod joint that has an inner ring assembly for receiving a journal of a shaft stump section, an outer ring assembly, wherein a race for running on a bell section is disposed on the outer surface of the outer ring assembly, numerous rolling elements, wherein the rolling elements are disposed between the inner ring assembly and the outer ring assembly, wherein the rolling elements are formed as rollers, and a cage assembly, wherein the rolling elements are disposed in the cage assembly.

BACKGROUND

Universal joints are often used in drive trains of vehicles for transferring the drive torque from a differential assembly or another drive output to a driven, in particular steered wheel, which ensure that the drive torque is transferred, and also enable changes in the angle between the drive output and an intermediate shaft. The universal joint makes it possible for the driven wheels to move up and down or rotate, e.g. on uneven roadways, independently of the gearbox output usually connected to the vehicle body.

Universal joints structured as tripod joints are known. These tripod joints comprise a shaft end, acting as the first element of the joint, that has journal sections projecting radially away from the end of the shaft formed thereon, on which rollers are disposed. This first joint element is inserted into a bell acting as the second joint element, wherein they can roll over an inner surface of the bell such that the shaft end swivels in relation to the bell, but can still be rotated conjointly with the bell.

A tripod joint of this type is described by way of example in DE 10 2004 025 531 A1. This patent relates in particular to the structure of the roller bearing, which has an inner ring disposed on the journal and an outer ring, which can roll over the inner surface of the bell with its outer circumference. Needle shaped rolling elements are disposed between the inner ring and the outer ring, which are guided in a cage.

Another type of a related tripod joint is disclosed in EP 1210945 A2, in which the inner race is not formed on an inner ring, as is the case with the embodiment described above, but rather, is formed directly on the surface of the joint journal.

SUMMARY

One object of the present disclosure is to simplify the pod joint assembly. This may be solved by a roller bearing for a pod joint and a pod joint that has this roller bearing. Various embodiments of the disclosure can be derived from the disclosure below and the attached drawings.

The subject matter of the disclosure is a roller bearing suitable and/or designed for a pod joint. In particular, the roller bearing is designed as a pod joint roller bearing. In particular, the roller bearing is designed as a radial bearing, specifically a radial roller bearing. The roller bearing defines a roller bearing axis with the axis of rotation. A radial roller bearing is formed by the rolling elements, rollers and needles in this case, and by an inner race and an outer race, in which the rolling elements roll.

The pod joint and/or the roller bearing may be disposed in a drive train of a vehicle. The vehicle that has the pod joint and/or the roller bearing optionally forms a further subject matter of the disclosure. The pod joint may be disposed in the drive train between a gearbox output, in particular a differential gearbox output, and a driven wheel. The pod joint may be disposed between the gearbox output and an intermediate shaft, in particular a drive shaft, for transferring a drive torque to the driven wheel. The vehicle may have two pod joints on a driven shaft. The driven shaft may also be a turning shaft, e.g. the front axle of a passenger car.

The function of the pod joint is to create an articulated connection between the gearbox output and the intermediate shaft for transferring the drive torque, that can swivel or change its angle.

The pod joint may be configured as a universal joint. In particular, the pod joint is configured as a bipod joint, tripod joint, or quadropod joint.

The pod joint may have a shaft stump section acting as a first joint element that has journals disposed thereon. By way of example, the journals can be formed as an integral part of the shaft stump section. Alternatively, the journals are formed on a star with a hub, the "points" of which are formed by the journals. The journal is placed on a shaft or shaft stump with the hub. The journals may project radially from, or at least at an angle to, a shaft axis that forms the axis of rotation and/or the longitudinal extension of the shaft stump section. The journals may be distributed evenly over the circumference of the shaft stump section. It is provided that the roller bearing is or can be placed on the journal. Such a roller bearing may be placed on each of the journals.

The pod joint also has a bell section acting as the second joint element, often referred to as a "tulip." The shaft stump section is inserted with the journals and the roller bearings into the bell section, wherein the roller bearings (outer ring assembly) roll with their outer race over one or more surfaces, in particular inner surfaces, of the bell section, such that the shaft stump section can swivel in relation to the bell section.

In one design, the shaft stump section forms a subsection of the intermediate shaft, or is functionally connected thereto, and the bell section is functionally connected to the gearbox output. In an alternative design, the shaft stump section is functionally connected to the gearbox output, and the bell section forms a subsection of the intermediate shaft, or is functionally connected thereto.

The inner race is formed directly on a cylindrical journal in the region of the inner race. Alternatively, the roller bearing has an inner ring assembly, configured and/or suitable for receiving one of the journals. The inner ring assembly may be placed on the journal in particular such that it cannot rotate and/or be displaced in relation thereto, specifically such that the journal passes through the inner ring assembly. The inner ring assembly can be composed of numerous individual parts, but may be formed as a single piece and/or from a single material. The inner ring assembly may be formed as cast inner ring. The inner ring assembly has the inner race on its outer radial surface and a contact surface for contact with the journal on the inner surface.

Roller bearings with their inner race formed directly on the surface of the journal require less radial structural space than those with an inner ring. Furthermore, these roller bearings have fewer components due to the lack of an inner ring. In contrast, an additional articulated connection to the drive shaft can be created via roller bearings with an inner ring, in particular then when the seat for the journal is spherical.

The roller bearing also has an outer ring assembly, which may be disposed coaxially and/or concentrically to the inner ring assembly in relation to the roller bearing axis. The outer ring assembly can have a multi-part design, but it may have an integral and/or single-piece design. In particular, the outer ring assembly is designed as a cast outer ring. The outer ring assembly has an outer race on the radial inner surface, and a race on the outer surface, in particular the radial outer surface, that runs, in particular rolls and/or slides, over the bell section. The race running over the bell section may have a round, particularly spherical, design in a longitudinal section through the roller bearing axis. With a spherical design, the center of the of the spherical curvature may be located on the roller bearing axis. The difference between the greatest diameter of the race and the smallest diameter may be at least two millimeters, may be at least four millimeters.

Furthermore, the roller bearing has numerous rolling elements, wherein the rolling elements are disposed between the inner ring assembly and the outer ring assembly. In particular, the rolling elements are disposed between the inner ring assembly and the outer ring assembly such that they can roll. The rolling elements may roll over the outer race of the inner ring assembly and the inner race of the outer ring assembly. The rolling elements are formed as rollers, in particular cylindrical rollers, specifically as needles or needle rollers. In the form of needles or needle rollers, the rolling elements have a length in the axial direction that is at least two and a half times as long as the diameter of the respective rolling element, wherein needle rollers have a greater diameter than needles.

Furthermore, the roller bearing has a cage assembly, wherein the rolling elements are disposed in the cage assembly. The cage assembly may be designed to separate the rolling elements over the roller bearing axis in the circumferential direction.

It is proposed in the framework of the disclosure that the cage assembly is designed as a central cage. The rollers can be divided, in particular along their imaginary axial extensions, into a central middle area and two adjacent running areas. The central cage is designed such that it only guides the rollers in the middle area, in particular separating them. The running areas extend away from the central cage such that they are exposed. In a radial view from above, the central cage can be seen in the middle area, and exposed ends of the rollers can be seen on each side thereof. The exposed ends are the rolling elements in this design, in particular the rollers, which are disposed such that they extend from the central cage. In particular, the rollers are only retained at the middle, wherein the exposed ends of the rollers are spaced apart by the central cage. The central cage may extend axially over less than 50%, or may extend less than 40% of the length of the rollers.

A concept of the disclosure is that, as a result of the central cage, the rollers can be disposed in defined positions in the roller bearing, thus simplifying the assembly of the roller bearing. The central cage is suitable for use in a roller bearing because the roller bearing—despite its name—only has to implement slight relative rotations between the inner ring assembly and the outer ring assembly. As a result, the central cage can be used even though it may not be ideal for guiding rolling elements with respect to frictional losses.

The necessary structural space for the central cage can be obtained, for example, through grooves in the inner ring assembly and/or—in one design—in the outer ring assembly. The rolling contact for the rolling or running between the inner ring assembly and that the outer ring assembly only takes place over the running areas of the rollers—these being the regions on the race with grooves to the left and right of the middle area. The rollers can roll over their entire supporting lengths, thus also in the middle, on the race without grooves.

In an example structural design of the disclosure, the rollers each have an uninterrupted and/or constant diameter in their axial extension over the middle area and the running areas. This design has the advantage that an axial displacement of the rollers in the central cage does not cause problems, because the middle area and the running areas merge without a transition. Moreover, the design has the advantage that the rollers can be made inexpensively, because they do not require any tapering, or other adjustments to the diameter for the central cage. Alternatively, the known rollers or needles with spherical ends, or that are rounded over their entire lengths, can be used.

In an example structural design of the disclosure, the central cage is formed as an uninterrupted or interrupted circumferential web with receivers, in particular snap-in receivers, for the rollers. In this design, it is possible to first snap the rollers into the snap-in receivers during assembly, and to subsequently install the thus equipped central cage. The snap-in receivers may open radially inward, and encompass the rollers in each case such that when they are installed in the roller bearing, the rollers are aligned over the middle area, and the two running areas bear on the inner ring assembly. Alternatively, the receivers are configured such that they open radially outward, and the central cage is constructed such that when the roller bearing is installed, the rollers are in contact with the outer ring assembly in a straight line along the middle area and the two running areas. Both designs have the advantage that grooves for the central cage are provided in only the inner ring assembly or only the outer ring assembly. Such a cage can be produced simply and inexpensively, in particular from plastic.

In principle, the central cage can have a closed circumference. This design results in a particularly stable central cage.

In one development, it is proposed that there is at least one separation in the circumference of the central cage over the axis of the roller bearing. In particular, the central cage is interrupted at the at least one separation.

One consideration of the development is that the installation of the cage assembly with the rolling elements between the inner ring assembly and the outer ring assembly might be difficult due to structural constraints. Because the central cage has at least one separation, it is possible to install the central cage in a form other than the later geometric form it assumes, in particular in a form with a different diameter than that of the later central cage. It is thus possible to open or constrict the central cage during assembly, wherein the bending may be resilient, in order to simplify the installation of the central cage with or without the rolling elements between the inner ring assembly and the outer ring assembly. With numerous separations, the individual segments of the central cage can be inserted independently, such that assembly is also simplified using numerous separations.

In one possible design of the disclosure, the central cage has exactly one separation. By way of example, the central cage is designed as a broken ring. This design has the advantage that the central cage can be manipulated in a manner similar to a simple cage with a closed circumference when assembled, but its diameter can be altered during assembly by expanding or constricting it.

In an alternative design of the disclosure, the central cage is designed as a segmented cage, and/or has more than one separation. The central cage is broken into exactly or at least two segments over its circumference. By way of example, the central cage can be halved in its circumference. In other embodiments, it is also possible for the central cage to have segments of different sizes over its circumference. It is thus possible, within the scope of the disclosure, for one segment to form three quarters of the central cage, and the other segment to form one quarter. The central cage can also be formed by numerous segments, e.g. three or four segments, which can be aligned successively over the circumference. Assembly is also simplified in this design, because the segments of the central cage can be simply placed on or snapped onto the inner ring assembly.

In one possible development of the disclosure, the outer ring assembly has a circumferential race groove for the rollers. The rollers are thus disposed in the outer ring assembly such that the rollers are guided axially by the lateral walls of the circumferential race groove.

In an alternative or possible development of the disclosure, the roller bearing has at least one lateral securing ring, or may have two lateral securing rings. It is provided that the lateral securing ring is disposed in the outer ring assembly, and secures the rollers in the axial direction. By way of example, the outer ring assembly has circumferential annular grooves for the lateral securing ring(s), in which the lateral securing ring(s) are inserted in a form-fitting manner.

Another subject matter of the disclosure is formed by a pod joint for a vehicle, wherein the pod joint has at least one roller bearing, as described above. The pod joint may be designed as a tripod joint, and has three journals and may have three roller bearings. In other embodiments, it can also be provided that the pod joint has only two journals or has four journals or more, and also has a corresponding number of such roller bearings.

BRIEF DESCRIPTION OF THE DRAWINGS

Further features, advantages and effects of the disclosure can be derived from the following description of exemplary embodiments of the disclosure, and the attached drawings. Therein.

DETAILED DESCRIPTION

Figure 1:
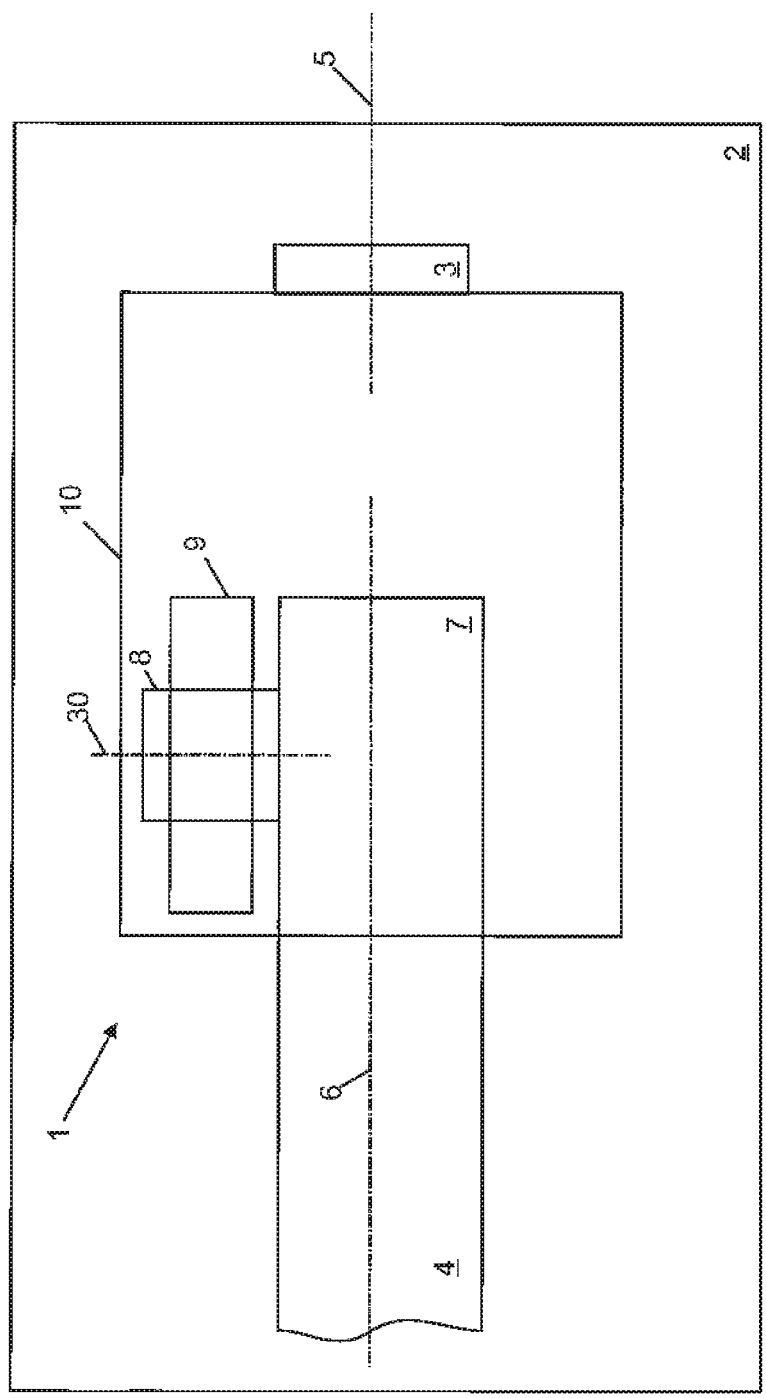
FIG. 1 shows a strongly schematized illustration of a pod joint as an exemplary embodiment of the disclosure.

FIG. 1 shows a pod joint 1 in a strongly schematized illustration for a vehicle 2, shown merely as a block, as one exemplary embodiment of the disclosure.

The pod joint 1 is disposed in the drive train between a gearbox output 3, in particular a differential gearbox, and an intermediate shaft 4, in particular a wheel driveshaft or axle. The gearbox output 3 defines an output shaft 5, the intermediate shaft 4 defines a shaft axis 6. The pod joint 1 is designed to transfer a rotation, and thus a drive torque, from the output 3 to the intermediate shaft 4, and at the same time enable a swiveling or change in angle between the output shaft 5 and the shaft axis 6, as may take place, for example, when the driven wheel connected to the intermediate shaft 4 is deflected. The intermediate shaft 4 has a shaft stump section 7, on which numerous journals 8 are disposed, there being three journals 8 in this exemplary embodiment, which extend radially in relation to the shaft axis 6. The journals 8 are disposed evenly over the circumference of the shaft axis 6, such that they form a pod star, a tripod star in this example. Only one of the journals 8 is illustrated in FIG. 1. A roller bearing 9 is disposed on each journal 8, which has a roller bearing axis 30 serving as the axis of rotation, which is oriented radially to the shaft axis 6.

The pod joint 1 also has a bell section 10, which is coupled to the output 3 for conjoint rotation therewith, and which provides races for the roller bearings 9.

Although an exemplary embodiment is shown in FIG. 1 in which the bell section 10 is coupled to the output 3 for conjoint rotation therewith, and the shaft stump section 7 is coupled for conjoint rotation with the intermediate shaft 4, it is also possible in other exemplary embodiments for the shaft stump section 7 to be coupled for conjoint rotation with the output 3, and the bell section to be coupled for conjoint rotation with the intermediate shaft 4. It is also possible for the bell section 10 to have a closed circumference, or for it to have open regions.

Figure 2A:
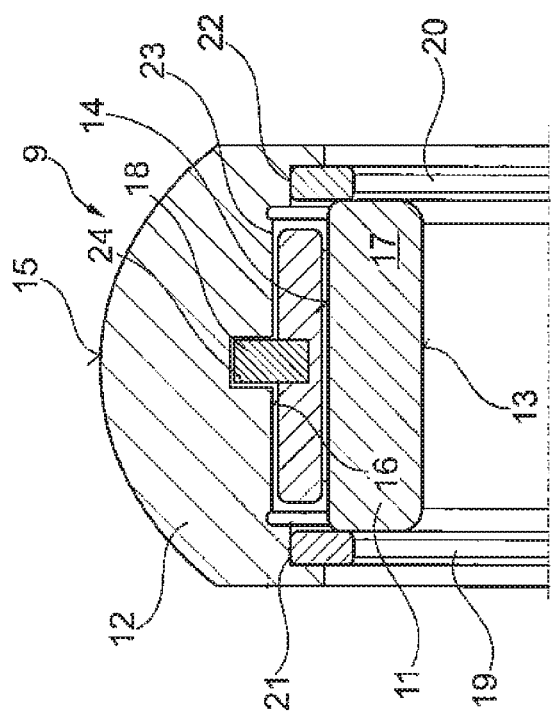
FIGS. 2a, b show schematic longitudinal sections of two different embodiments of roller bearings for the pod joint shown in FIG. 1.

Longitudinal sections of two exemplary embodiments of the roller bearing 9 are shown in FIGS. 2a, b. The roller bearings 9 each have an inner ring assembly 11 and an outer ring assembly 12, which are disposed coaxially and concentrically to the roller bearing axis 30.

The inner ring assembly is an inner ring formed as a single piece and/or from a single material, and has a hollow cylindrical receiver 13 for the journal 8 on its inner radial surface. The outer radial surface forms a cylindrical surface functioning as the inner race 14.

The outer ring assembly 12 is formed as a single piece and/or from a single material, and has a race 15 on the outer radial surface that runs along an inner region of the bell section 10. The race 15 is spherical in the longitudinal section shown here, and is spherical in relation to the race roller axis 10 in this exemplary embodiment. The outer ring assembly 12 has an outer race 16 on its inner radial surface.

Numerous rolling elements 17 are disposed between the inner ring assembly 11 and the outer ring assembly 12. The rolling elements 16 are formed as rollers, in particular cylindrical rollers, and implemented as needle rollers in both exemplary embodiments, wherein their longitudinal extension in the axial direction to the race axis 30 is more than five times the diameter of the rolling elements 17. The rolling elements 17 roll along the inner race 14 on one side and the outer race 16 on the other side. The inner ring assembly 11 can thus rotate in relation to the outer ring assembly 12 over the rolling elements 17, wherein the inner ring assembly 11 and the outer ring assembly 12 rotate in opposite directions over the rolling elements 17.

Figure 3:
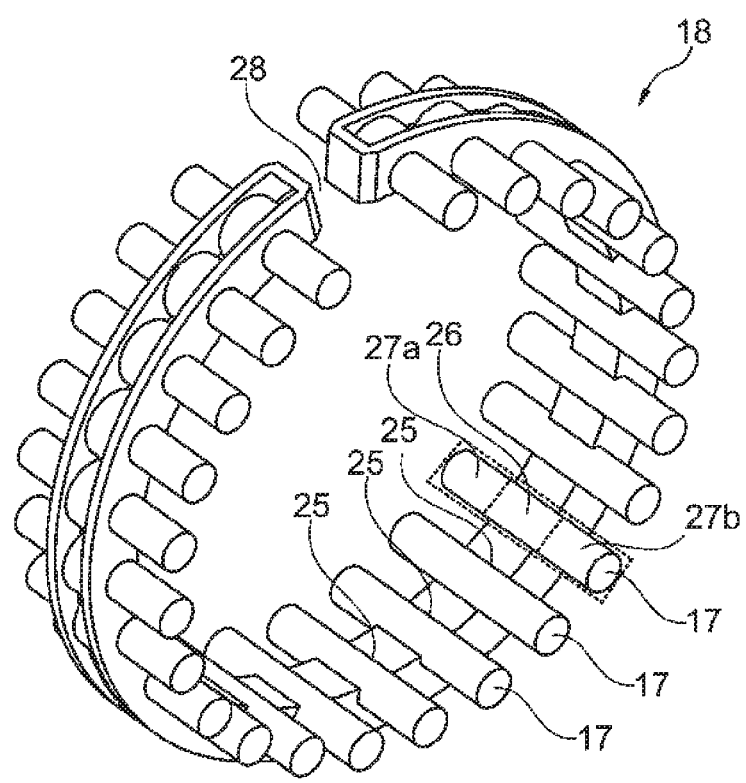
FIG. 3 shows a three-dimensional illustration of an exemplary embodiment of a cage assembly for the roller bearings in FIGS. 2a, b, or in the pod joint according to FIG. 1.

The rolling elements 17 are disposed in a cage assembly 18, which is described in reference to FIG. 3.

The roller bearing 9 also has two lateral securing rings 19, 20, which secure the rolling elements 17 in the axial direction. The lateral securing rings 19, 20 are placed in circumferential annular grooves 21, 22, which are formed in the outer ring assembly 12. The lateral rings 19, 20 extend radially inward, such that they overlap the inner ring assembly 11 when seen axially from above, thus likewise securing the inner ring assembly 11 against axial displacement.

Figure 2B:
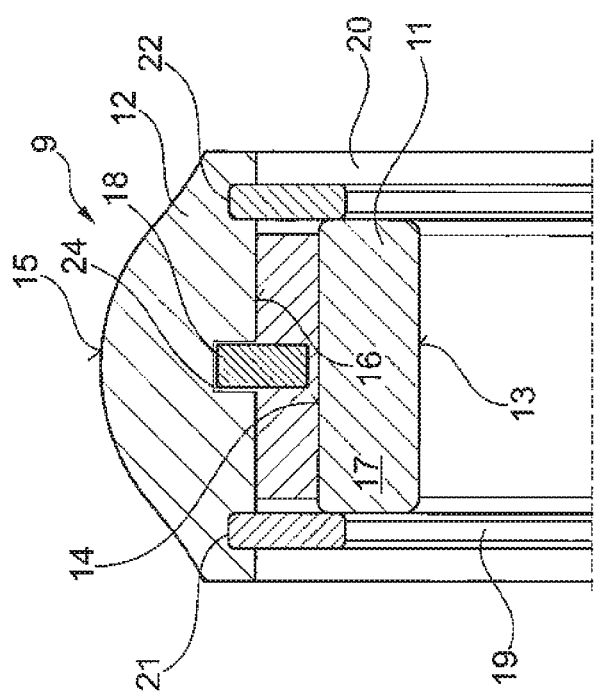

In FIG. 2a, the outer race 16 has a hollow cylindrical design, and extends to the lateral securing rings 19, 20 via an extension. In FIG. 2b, in contrast, the outer ring assembly 12 has a circumferential race groove 23, which is axially wide enough that the rolling elements 17 pass axially between the lateral walls of the race groove 23. There is a circumferential groove 24 in the outer ring assembly 12 in both of the exemplary embodiments shown in FIGS. 2a and 2b.

FIG. 3 shows an exemplary embodiment of a cage assembly 18 with the rolling elements 17 placed therein. The cage assembly 18 is formed as a central cage. The cage assembly 18, or the central cage, is implemented as a circumferential web that has a rectangular cross section in this example. The cage assembly is made of plastic. The cage assembly 18 has receivers that are parallel to the roller bearing axis 30, and open radially inward. One rolling element 17 is placed in each receiver 25, wherein the rolling element 17 in the form of a roller extends in the axial direction. The rolling elements 17 are placed in receivers 25 in the cage assembly 18, and may be snapped in place, such that they are retained in a form-fitting manner, at least in the radial direction with respect to the roller bearing axis 30. The rolling elements 17 each have a middle area 26 and an adjacent running area 27a, 27b on each side thereof. The cage assembly 18 is designed structurally such that the rolling elements 17 extend radially inward, over the cage assembly 18, and the rolling elements 17 roll along the inner race 14 in a straight line along the middle area and the two running areas 27a, b. In contrast, only the two running areas 27a, b are in contact with the outer race 16. The outer race 16 is divided into two sub-regions by the groove 18, wherein one of the running areas 27a, b rolls along each of the sub-regions.

The cage assembly 18 does not have a closed circumference about the roller bearing axis 30, instead exhibiting a separation 28, such that the circumference of the cage assembly 18 is fully interrupted once. The cage assembly 18 can be more easily assembled as a result of the separation 28. The diameter of the cage assembly 18 in FIG. 3 can thus be altered by expanding or constricting it. In other exemplary embodiments, it is also possible for the central cage to be formed by segments, comprising numerous central cage segments.

LIST OF REFERENCE SYMBOLS 1 pod joint
2 vehicle
3 gearbox output
4 intermediate shaft
5 output shaft
6 shaft axis
7 shaft stump section
8 journal
9 roller bearing
10 bell section
11 inner ring assembly
12 outer ring assembly
13 hollow cylindrical receiver
14 inner race
15 race
16 outer race
17 rolling element
18 cage assembly
19 lateral securing ring
20 lateral securing ring
21 annular groove
22 annular groove
23 race groove
24 groove
25 receivers
26 middle area
27a, b lateral areas
30 roller bearing axis

The invention claimed is:

1. A roller bearing for a pod joint, comprising:
an inner race;
an outer ring assembly;
a race that runs along a bell section coupled to a gearbox output, and is disposed on an outer surface of the outer ring assembly;
a plurality of rolling elements, wherein the rolling elements are disposed between the inner race and the outer ring assembly and are formed as rollers; and
a cage assembly, wherein the rolling elements are disposed in the cage assembly, wherein the cage assembly is formed as a central cage, wherein the rollers pass through the central cage in a middle area, and running areas thereof project outward from both sides of the central cage.

2. The roller bearing of claim 1, wherein the inner race is formed on an inner ring assembly for receiving a journal of a shaft stump section.

3. The roller bearing of claim 2, wherein the central cage is formed as a circumferential web that has receivers for the rollers.

4. The roller bearing of claim 3, wherein the central cage has at least one separation.

5. The roller bearing of claim 4, wherein the central cage is formed as a segmented cage and has more than one separation.

6. The roller bearing of claim 1, wherein the plurality of rolling elements are formed as needles.

7. The roller bearing of claim 1, wherein the outer ring assembly has a circumferential race groove for the rolling elements.

8. The roller bearing of claim 1, wherein at least one lateral securing ring is disposed in the outer ring assembly, and secures the rolling elements in an axial direction.

9. The roller bearing of claim 1, wherein the roller bearing includes an inner ring assembly that has a single piece design, and an outer race for the rolling elements in the outer ring assembly.

10. A roller bearing comprising:
a roller bearing axis with an axis of rotation;
an inner race;
an outer race;
a cage device; and
one or more rolling elements, wherein the rolling elements are arranged between an inner ring assembly and an outer ring assembly, and the rolling elements are arranged in the cage device and the rolling elements are guided in a central region by the cage device and protrude from both sides of the central region in running regions, wherein the roller bearing is disposed in a drive train of a vehicle between a gearbox output and an intermediate shaft.

11. The roller bearing of claim 10, wherein the intermediate shaft is a drive train shaft.

12. A pod joint comprising:
a bell section that is coupled to a gearbox output and provides a race for one or more roller bearings, wherein the one or more roller bearings include:

an inner ring assembly for holding a journal of a shaft stump section;

an outer ring assembly;

a raceway for running on the bell section that is arranged on an outside of the outer ring assembly;

a cage device; and a plurality of rolling elements, wherein the rolling elements are arranged between the inner ring assembly and the outer ring assembly, and the plurality of rolling elements are arranged in the cage device and the rolling elements are guided in a central region by the cage device and protrude from both sides of the cage device in running regions.

13. The pod joint of claim 12, wherein the inner ring assembly includes a hollow cylindrical receiver for a journal.

14. The pod joint of claim 12, wherein the cage device includes receivers that open radially inward and are parallel to a roller bearing axis.

15. The pod joint of claim 12, wherein the plurality of rolling elements are configured to roll over an outer race of the inner ring assembly and an inner race of the outer ring assembly.

16. The pod joint of claim 12, wherein the cage device is configured to separate the rolling elements over a roller bearing axis in a circumferential direction.

17. The pod joint of claim 12, wherein the roller bearing further includes one or more lateral securing rings placed in circumferential annular grooves formed in the outer ring assembly.

18. The pod joint of claim 17, wherein an outer race of the outer ring assembly includes a hollow cylindrical design and extends to the lateral securing rings via an extension.

* * * * *